(12) United States Patent
Huffer

(10) Patent No.: US 10,597,202 B2
(45) Date of Patent: Mar. 24, 2020

(54) RESEALABLE LIDDING WITH PATTERNED ADHESIVE

(71) Applicant: Sonoco Development, Inc., Hartsville, SC (US)

(72) Inventor: Scott W. Huffer, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 166 days.

(21) Appl. No.: 15/784,496

(22) Filed: Oct. 16, 2017

(65) Prior Publication Data

US 2019/0112109 A1    Apr. 18, 2019

(51) Int. Cl.
| B65D 43/02 | (2006.01) |
| B32B 27/28 | (2006.01) |
| B32B 7/06 | (2019.01) |
| B65D 77/20 | (2006.01) |
| B32B 7/12 | (2006.01) |

(52) U.S. Cl.
CPC ............... *B65D 43/02* (2013.01); *B32B 7/06* (2013.01); *B32B 7/12* (2013.01); *B32B 27/28* (2013.01); *B65D 77/2056* (2013.01); *B65D 77/2096* (2013.01); *B65D 2543/00092* (2013.01); *B65D 2543/00425* (2013.01); *B65D 2577/205* (2013.01); *B65D 2577/2091* (2013.01)

(58) Field of Classification Search
CPC ........ B65D 77/2096; B65D 2577/2091; B65D 75/5833; B65D 2577/2066; B65D 75/5855; B65D 77/2056; B65D 2577/205; B65D 75/5838; B65D 77/2044
See application file for complete search history.

(56) References Cited

U.S. PATENT DOCUMENTS

| 4,260,061 A | 4/1981 | Jacobs |
| 4,673,601 A | 6/1987 | Lamping et al. |
| 4,735,335 A | 4/1988 | Torterotot |
| 4,762,230 A | 8/1988 | Croce |

(Continued)

FOREIGN PATENT DOCUMENTS

| EP | 0435493 A2 | 3/1991 |
| EP | 0905048 A1 | 3/1999 |

(Continued)

OTHER PUBLICATIONS

International Search Report and Written Opinion for corresponding international apllicaiton No. PCT/US2018/055775, dated Dec. 17, 2018.

*Primary Examiner* — Shawn M Braden
(74) *Attorney, Agent, or Firm* — Flaster/Greenberg PC

(57) ABSTRACT

A package is defined by a rigid base member and a peripheral flange surface. A flexible lidding member is heat sealed to the flange. The lidding member includes a first layer having a perimeter portion fixed to the flange and a second layer adhered to the first layer. An adhesive layer includes a permanent adhesive central portion and a perimeter pressure sensitive adhesive portion overlapping with the flange. A central score line is provided within the first layer, surrounding the central adhesive portion. A tab portion is formed as part of the perimeter portion of the lidding member and includes an edge score line formed in the first layer directly adjacent the fixed perimeter portion of the first layer.

15 Claims, 4 Drawing Sheets

(56) References Cited

U.S. PATENT DOCUMENTS

| | | |
|---|---|---|
| 6,258,425 B1 | 7/2001 | Parmentier et al. |
| 6,383,592 B1 | 5/2002 | Lowry et al. |
| 6,726,230 B2 | 4/2004 | Fagen et al. |
| 7,681,732 B2 | 3/2010 | Moehlenbrock et al. |
| 7,717,620 B2 | 5/2010 | Herbert et al. |
| 8,256,636 B2 | 9/2012 | Huffer |
| 8,333,511 B2 | 12/2012 | Rutzinger et al. |
| 8,746,490 B2 | 6/2014 | Huffer et al. |
| 8,889,205 B2 | 11/2014 | Sierra-Gomez et al. |
| 9,150,342 B2 | 10/2015 | Sierra-Gomez et al. |
| 9,808,368 B2 | 11/2017 | Huffer |
| 9,850,056 B2 | 12/2017 | Shaw et al. |
| 2001/0015356 A1 | 8/2001 | Jud |
| 2009/0226117 A1 | 9/2009 | David et al. |
| 2009/0304874 A1 | 12/2009 | Stephens et al. |
| 2010/0172604 A1 | 7/2010 | Anderson et al. |
| 2013/0020328 A1* | 1/2013 | Duan ............... B65D 77/2056 220/359.3 |
| 2014/0124507 A1 | 5/2014 | Huffer et al. |
| 2015/0158643 A1 | 6/2015 | Coker et al. |
| 2015/0183564 A1* | 7/2015 | Henderson ......... B65D 77/2096 220/359.3 |
| 2016/0031619 A1 | 2/2016 | Coker et al. |
| 2016/0159547 A1 | 6/2016 | Huffer et al. |
| 2017/0096276 A1* | 4/2017 | Zanarella ........... B65D 77/2056 |
| 2017/0240331 A1* | 8/2017 | Huffer ................ B65D 75/5855 |
| 2018/0071974 A1* | 3/2018 | Huffer ................ B65D 75/5855 |

FOREIGN PATENT DOCUMENTS

| | | |
|---|---|---|
| EP | 1052186 A2 | 11/2000 |
| EP | 2347972 A1 | 7/2011 |
| WO | 9618555 | 6/1996 |
| WO | 2005100197 A2 | 10/2005 |
| WO | 2009111153 A1 | 9/2009 |
| WO | 2013114091 A1 | 8/2013 |
| WO | 2015145338 A1 | 10/2015 |
| WO | 2016133904 A1 | 8/2016 |

\* cited by examiner

RESEALABLE LIDDING WITH PATTERNED ADHESIVE

FIELD OF THE INVENTION

The present disclosure relates in general to a lidding material for use with packaging for products. The packaging in a preferred mode has a base member and the lidding material attached to an upper rim of the base member. The lidding material is preferably formed from multiple layers and includes features for easy opening while also preventing or minimizing leakage of the contents of the package.

BACKGROUND OF THE INVENTION

The use of flexible film-based materials for closing relatively rigid base members is known. Such a packages may include a rigid plastic tub or tray, composite can, rigid paper box or other container, with the lidding member made of a multilayer flexible film or laminate that can be peeled off the base member to provide access to the contents of the package. In some cases, the peelable portion may be designed to be re-adhered to the rest of the package to provide a reclosing feature for storing unused contents of an opened package.

WO 2016-133904 shows a multi-layer film structure having a patterned adhesive and score line pattern that are used to define an opening flap to provide access to the interior of a package. The film is heat sealed to the flange of the container base with a score line defining a separation area.

U.S. Pat. No. 4,260,061 shows a sealable bag structure with a patterned PSA and permanent adhesive used to define a removable flap to open the sealed bag.

U.S. Pat. No. 6,383,592 shows a flexible film bag with a patterned adhesive in a portion of the bag wall. A removable sticker portion is cut from one layer of the bag wall adjacent the PSA portion in the adhesive pattern.

U.S. Pat. No. 7,717,620 shows a multi-layer film structure forming a package with a patterned PSA and permanent adhesive used to define a removable flap to open the sealed package.

US 2016/0159547 shows a re-sealable flexible package with a reinforced perimeter on the flexible lidding that blocks channeling upon resealing of the lidding to the rim of the base member.

SUMMARY OF THE INVENTION

The present disclosure relates to a package having a base member defining a cavity configured to receive an item therein, and including a flange that defines an exterior edge of the base member and surrounds the cavity. A lidding member is configured to be attached to the flange of the base member and covers the cavity to maintain the item therein. Further, the lidding member is configured to be peeled away from the flange of the base member to provide access to the cavity and is configured to be re-sealed to the flange. The lidding member includes a first layer configured to engage the flange of the base member and a second layer laminated to the first layer via an adhesive layer. The adhesive layer comprises a pattern applied pressure sensitive adhesive forming a perimeter that aligns with the flange of the base member. A central portion of the adhesive layer is formed by a permanent adhesive and configured to maintain the first layer secured to the second layer. A score line in the first layer surrounds at least a portion of the permanent adhesive portion of the adhesive layer. The second layer is configured to separate from the first layer when at least a portion of the lidding member is peeled away from the base member and the pressure sensitive adhesive portion permits separation of the perimeter of the first layer, outward of the score line, from the second layer. An undercut score line is provided adjacent the tab at a position directly adjacent the heat seal of the lidding to the flange of the base member.

The present disclosure also relates to a flexible, multi-layer lidding material configured to be attached to a flange of a base member to seal an item within the retaining cavity of the base member. The lidding member is configured to be heat sealed to the base member and then at least partially peeled away from the flange and thereafter re-sealed to the flange. The lidding material includes a bottom or first layer and a second or top layer, with the two laminated to one another via an adhesive layer. The adhesive layer comprises a pattern applied pressure sensitive adhesive forming a perimeter, with the pattern aligning with the flange of contemplated base member. A central portion of the adhesive layer is formed by a permanent adhesive and configured to maintain the central portion of the first layer secured to the second layer. A score line is provided in the first layer and surrounds at least a portion of the permanent adhesive portion of the adhesive layer. The second layer is configured to separate from the perimeter portion of the first layer when at least a portion of the lidding member is peeled away. The pressure sensitive adhesive portion permits separation of the perimeter of the first layer, outward of the score line, from the second layer. One or more undercut edge score lines are provided at a position directly adjacent the heat seal area. A projecting tab member is provided outside of the edge score line. The formed lidding material may be cut and applied to the container as desired.

Other features of the present invention and combinations of features will become apparent from the detailed description to follow, taken in conjunction with the accompanying drawings.

BRIEF DESCRIPTION OF THE DRAWINGS

For the purpose of illustrating the invention, the drawings show one or more forms that are presently preferred. It should be understood that the disclosure and claimed invention is not limited to the precise arrangements and instrumentalities shown in the drawings.

DETAILED DESCRIPTION

Figure 1:
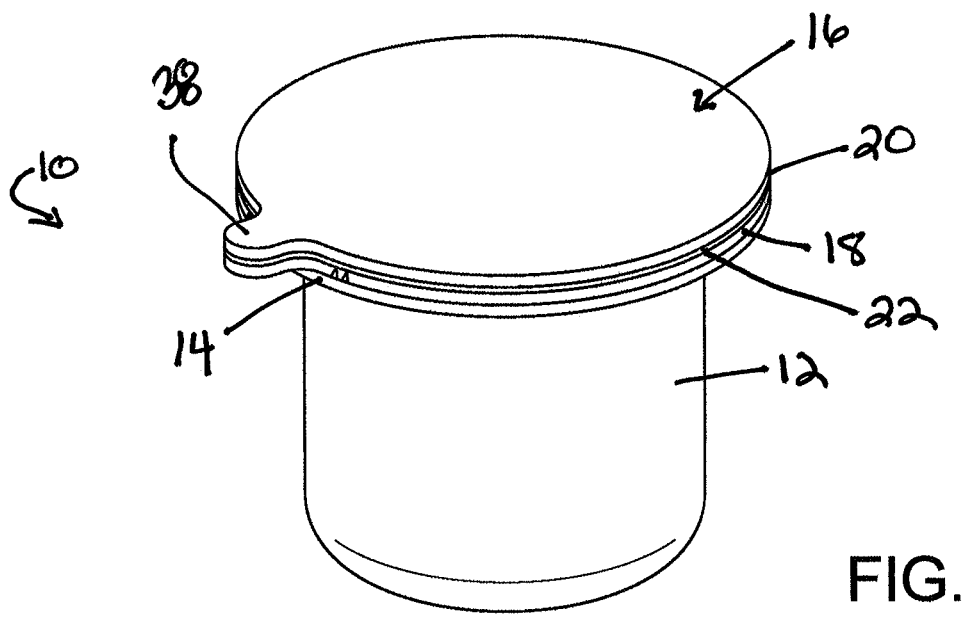
FIG. 1 shows an isometric side view of a package having a lidding material according to the present disclosure.
Figure 2:
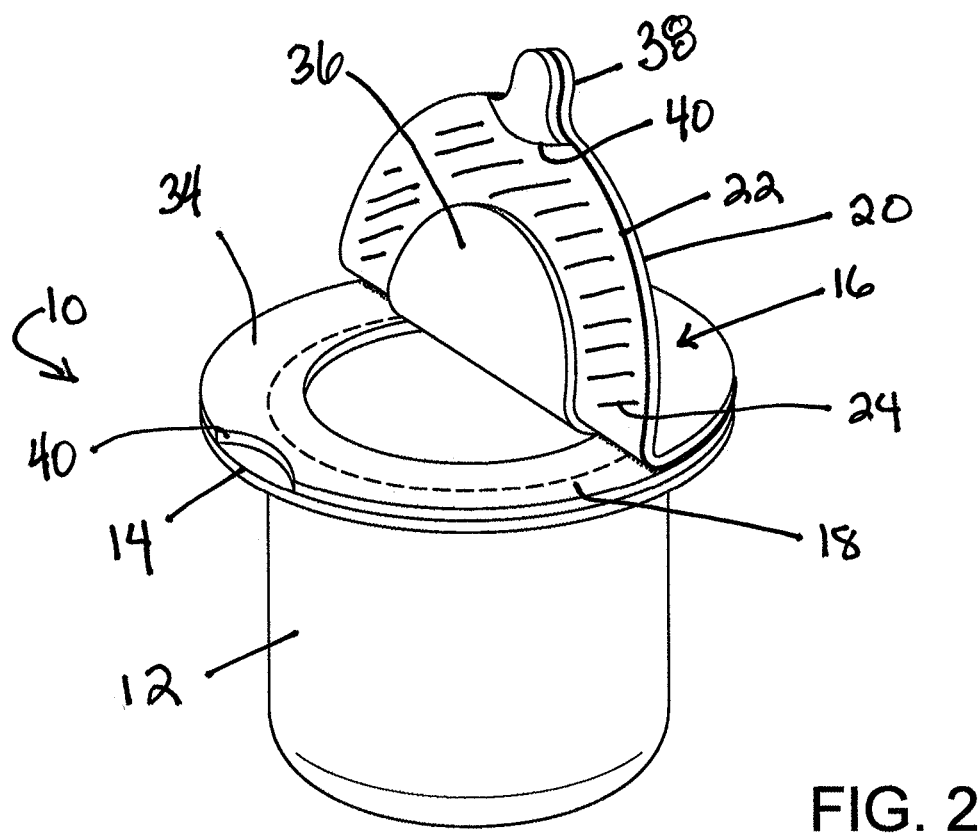
FIG. 2 is an isometric side view of the package combination from FIG. 1 showing a portion of the lidding material being separated from the package.

In the figures, where like numerals identify like elements, there is shown an embodiment of a package or container identified by the numeral 10. As shown in FIG. 1, the package 10 includes a relatively rigid base member 12 defining a cavity configured to receive an item therein. A flange 14 defines an exterior edge or rim of the base member and surrounds the cavity. A lidding member 16 formed of a flexible web material is attached to the flange 14 of the base member 12 and covers the cavity to maintain the item therein. As shown in FIG. 2, the lidding member 16 is configured to be peeled away from the flange 14 of the base member 12 to provide access to the cavity. The lidding member 16 includes a first or bottom layer 18, a second or top layer 20 and an adhesive layer 22 for securing the top layer 20 to the bottom layer 18. The bottom layer 18 engages and is secured to the flange 14 of the base member 12. The bottom layer 18 is preferably heat sealed to the top surface of the flange 14 to form a permanent bond.

Figure 3:
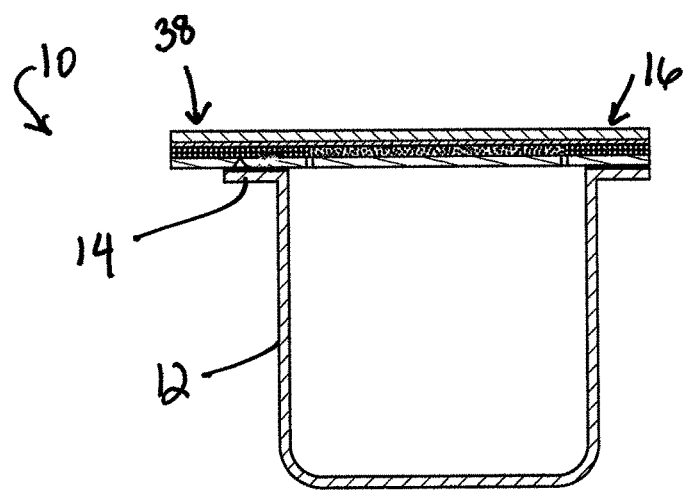
FIG. 3 is cross section view of the package combination as taken along line 4-4 in FIG. 1.
Figure 4:
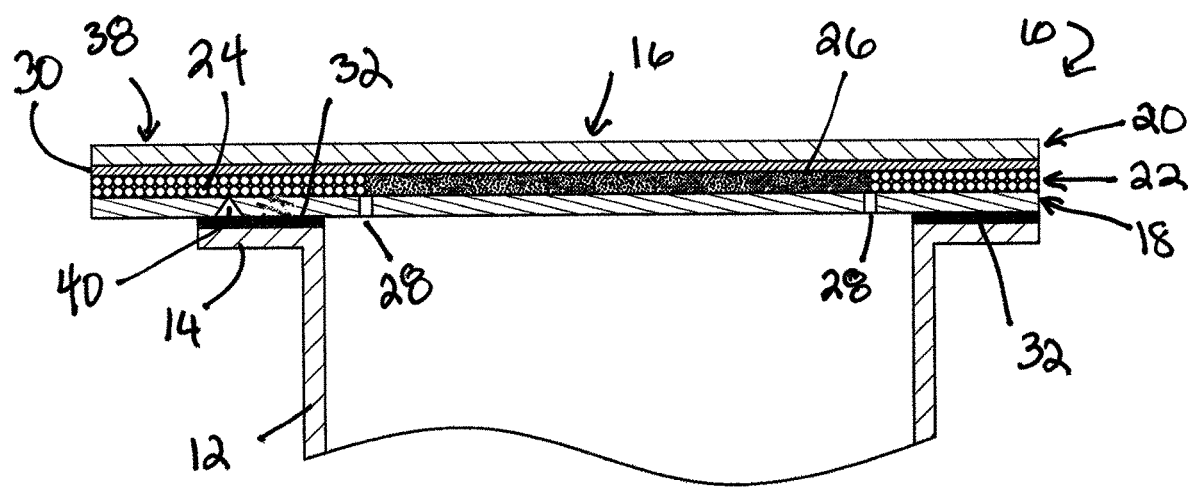
FIG. 4 shows an enlarged cross section of a portion of the lidding material as attached to the package.
Figure 5:
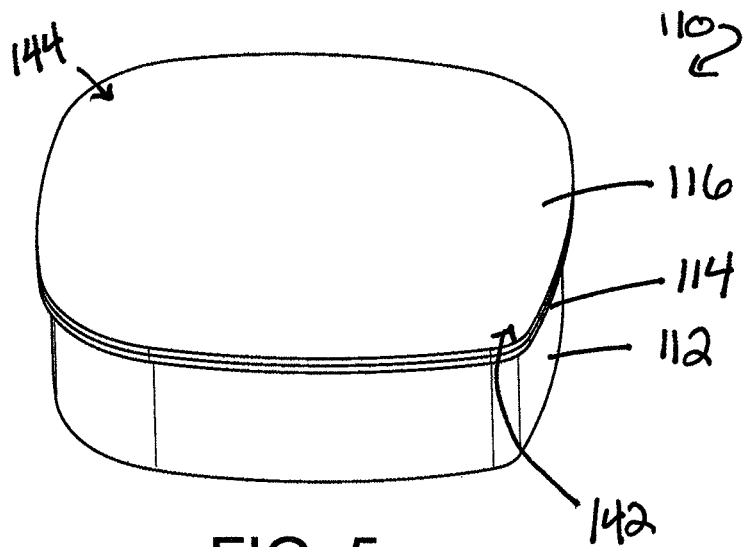
FIG. 5 shows an isometric side view of an alternate embodiment of a package having a lidding material according to the present disclosure.

Referring to FIGS. 3 and 4, the adhesive layer 22 comprises a pattern applied pressure sensitive adhesive 24 forming a perimeter that aligns with the flange 14 of the base member 12. A central portion of the adhesive layer 22 is formed by a permanent adhesive 26 and configured to maintain the first layer 18 secured to the second layer 20. A score line 28 in the first layer 18 surrounds at least a portion of the permanent adhesive 26 of the adhesive layer 22. An ink layer 30 is provided on a bottom surface or underside of the second layer 20. A portion of the bottom surface or underside of the first layer 18 is heat sealed 32 to a top surface of the flange 14.

As shown in FIG. 2, the second layer 20 is configured to separate from a perimeter portion 34 of the first layer 18 and may be peeled away from the flange 14 of the base member 12. The perimeter portion 34 of the first layer 18 is the part that is heat sealed 32 to the flange 14. The pressure sensitive adhesive 24 separates from the first layer as the second layer is peeled back. A central portion 36 of the first layer 18 separates from the perimeter portion 34 at the position of the score line 28. The central portion 36 remains fixed to the second layer 20 by the permanent adhesive 26 and peels back with the second layer 20. The exposed pressure sensitive adhesive 26 permits the second layer 20 to be resealed to the perimeter portion 34 of the first layer 18 to re-secure the contents within the cavity of the base member 12.

A tab portion 38 of the lidding material 16 is shown as extended beyond an outer edge of the flange 14 of the base member 12. A bottom edge score line 40 is provided in the first layer 18. The score line 40 is shown adjacent the heat seal 32. During opening, the user grabs the tab 38 to start the peel and separation of the lidding material 16. A portion of the first layer 18 remains secured to the second or top layer 20 in the region of the tab 38. The perimeter portion 34 of the first layer starts to separate from the second layer at the edge score line 40. The second layer may be removed from the package 10 completely or a section thereof may remain secured to the perimeter portion 34 of the first layer 18 by means of the pressure sensitive adhesive 24.

Figure 6:
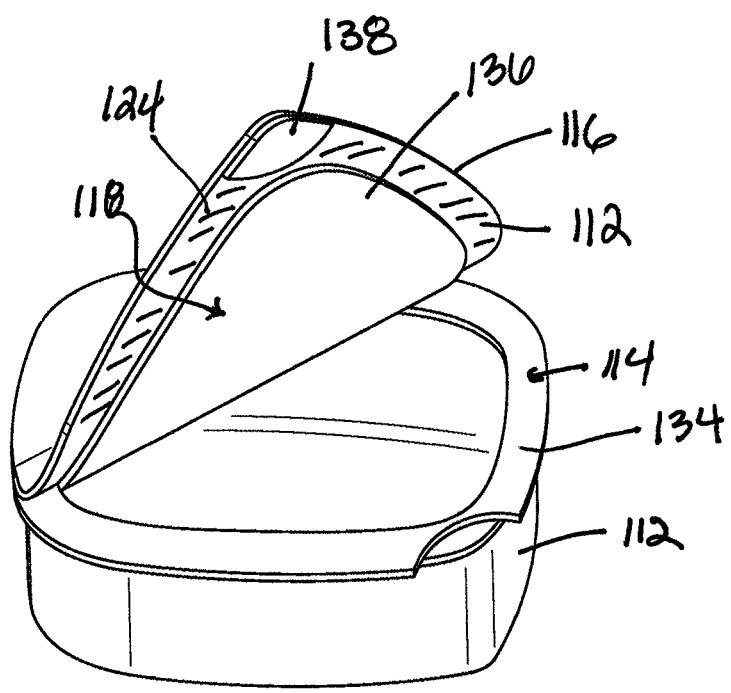
FIG. 6 is an isometric side view of the package combination from FIG. 5 showing a portion of the lidding material being separated from the package.

In FIGS. 5-8, a further embodiment of a package 110 is shown. The based member 112 has a plurality of side walls which are configured in generally rectangular form. A peripheral flange 114 project outwardly from the side walls and form a continuous rim surface. Lidding material 116 is attached to the flange 114 to seal the cavity formed by the base member 112. In FIG. 6, the lidding material 116 is shown partially pealed back to expose the cavity. A tab 138 is formed at one corner 142 of the lidding material 116, adjacent a corner formed by the sidewalls of the base member 112.

Figure 7:
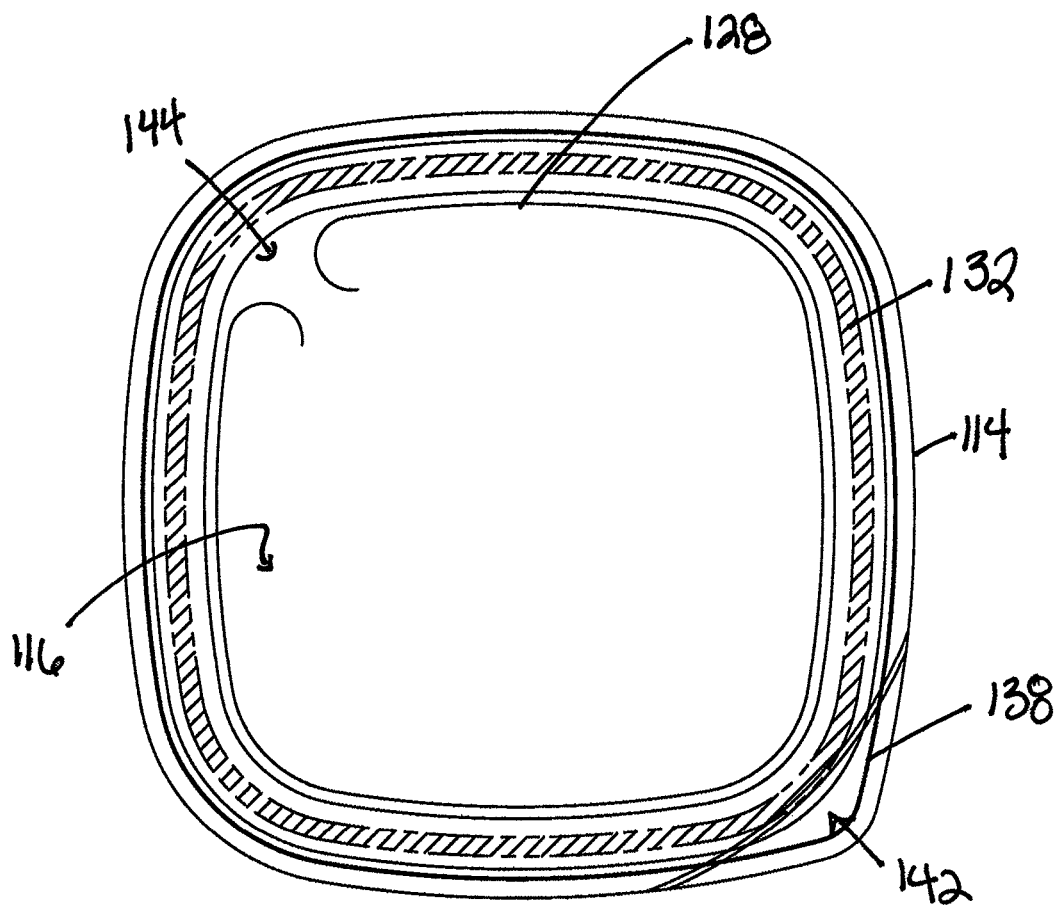
FIG. 7 is top plan view of the lidding from the package of FIGS. 5 and 6.

In FIG. 7, the top surface of the lidding material is shown with structural elements exposed. The lidding material 116 is heat sealed 132 to the flange 114. An inner score line 128 is provided inwardly of the heat seal 132. The score line 138 extends substantially around the inner periphery of the flange 114 from the tab corner 142, but does not connect at the opposite corner 144. The score line 138 forms the separation for the central part 136 of the first layer 118 from the perimeter portion 134 upon peeling, as shown in FIG. 6. As in the embodiment of FIGS. 1-4, the perimeter portion 134 is heat sealed 132 to the flange 114 and secured to the top or second layer 120 by a pattern applied pressure sensitive adhesive 124. A permanent adhesive is provided between the two layers 118, 120 in the center of the lidding material 116, adjacent the central portion 136 of the first layer 118.

At the peeling corner 142, the edge of the lidding material 116 projects past the heat seal 132 to form a tab 138. Two parallel score lines 140 are formed in an underside of the first layer 116. The score lines 140 are curved and partially overlap the heat seal area 132 adjacent to the flange 114 at the corner 142 of the base member 112. The heat seal application is contemplated to be applied to the lidding material and performed after filling the cavity of the base member.

Figure 8:
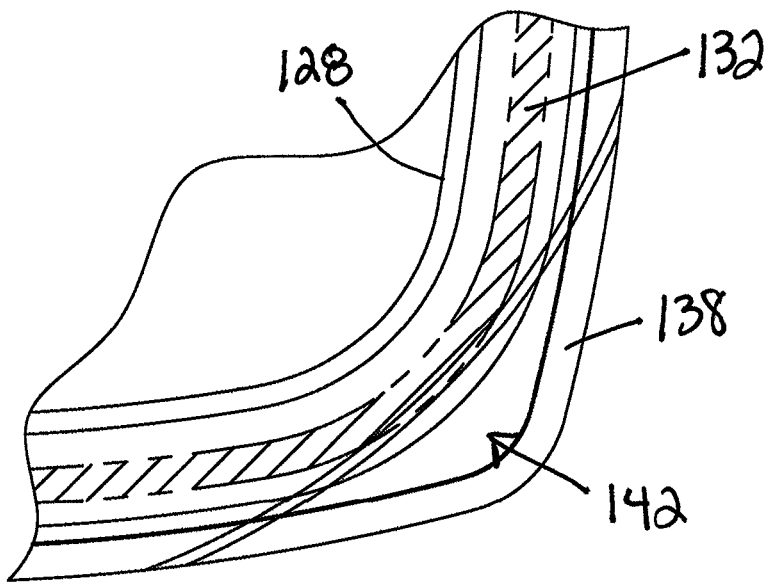
FIG. 8 shows an enlarged view of a portion of the lidding material as attached to the package base.

A single under cut, such as the edge score line 140 in FIGS. 3 and 4, is sufficient to permit the peeled opening of the layers of the lidding material 16, 116. A single cut is likely more easily accomplished. However, multiple undercuts, such as the parallel score lines 140 as shown in FIGS. 7 and 8, can be provided and may accommodate for misregistration with the heat seal 32, 132. Preferably, the edge score lines should be within 0.125 and 0.375 inches of the heat seal of the perimeter of the lidding to the flange of the base member. As shown, the score lines may overlap with the heat seal area. If positioned a greater distance from the heat seal, the tab may not peel the layers properly. All score lines may be performed by laser, mechanical or other means. A laser micro-perforation process is preferred. This form of scoring may be accomplished more easily if registered with the pattern applied permanent adhesive in the central portion of the lidding. The scoring is preferably performed after attachment of the layers and preferably extends through the first layer.

In both embodiments shown, the final trim of the lidding material may be accomplished after filling of product in the cavity of the base member and heat sealed attachment of the lidding material to the flange. This final trim cuts through the peripheral edge of the lidding layers and does not require a final top die cut of the package.

The provision of a permanent adhesive in the central area of the lidding material improves clarity of the central region. Hence, a clear lidding material may be used to allow for visual inspection of the product within the container. The ink layer does not need to be continuous across the central region of the lidding. Generally, the ink or graphics will be chemically compatible with the adhesive material chosen. Anti-fog coatings may also be applied to the layers along with primer materials.

In one contemplated embodiment, the lidding material may comprise a first or bottom layer of 92 gauge PET and a second or top layer of 100 gauge PET. The lidding material is contemplated to be flexible and preferably clear, except for applied graphics in the ink layer. The container is relatively rigid as compared to the lidding material and may be formed from an APET material. A sealant layer or coating may be provided on the bottom side of the first layer to promote heat sealing of the layer with the flange.

The present invention has been described and illustrated with respect to one or more exemplary embodiments. It should be understood by those skilled in the art from the foregoing that various other changes, omissions and additions may be made therein, without departing from the spirit and scope of the present invention, with the scope of the invention being described by the foregoing claims.

What is claimed is:

1. A package comprising:
  a rigid base member defining a cavity configured to receive an item therein, the base member have a peripheral flange surface; and
  a flexible lidding member configured to be engage on a perimeter portion the flange and to cover the cavity within the base member, the lidding member having
    a first layer, the first layer having a first layer perimeter portion that is fixed to the flange of the base member, and a first layer central portion spaced inwardly of the first layer perimeter portion,
    a second layer adhered to the first layer,
    an adhesive layer, the adhesive layer having
      a pattern applied permanent adhesive central portion, the central adhesive portion spaced inwardly from the first layer perimeter portion and permanently adhering the second layer to the first layer central portion, and
      a pattern applied pressure sensitive perimeter adhesive portion surrounding the central adhesive portion and overlapping with the flange of the base member, the perimeter adhesive portion configured to permit a perimeter portion of the second layer to at least partially separate from the first layer perimeter portion during a peeled opening of the lidding member from the base member;
    a central score line within the first layer, the central score line substantially surrounding the central adhesive portion, wherein the central score line permits the first layer perimeter portion to separate from the remainder of lidding member during the peeled opening of the lidding member, and
    a tab portion formed as part of the perimeter portion of the lidding member, the tab portion having an edge score line formed in the first layer, the edge score line positioned directly adjacent the fixed perimeter portion of the first layer,
  wherein the tab portion starts the peeling of the lidding member, with the second layer separating from the first layer between the edge score line and the central score line, exposing the perimeter adhesive portion, and
  wherein the exposed perimeter adhesive portion permits the selective resealing of the second layer to the perimeter portion of the first layer and the closing of the cavity of the base member.

2. The package of claim 1 wherein the edge score line overlaps with the portion of the first layer that is fixed to the flange.

3. The package of claim 1 wherein the edge score line is positioned at least 0.125 inch and not greater than 0.375 inches for the portion of the first layer that is fixed to the flange.

4. The package of claim 1 wherein the edge score line comprises multiple parallel score lines.

5. The package of claim 1 wherein the edge score line comprises two parallel edge score lines.

6. The package of claim 1 wherein the lidding member further comprises an ink layer positioned between the adhesive layer and the second layer.

7. The package of claim 1 wherein the lidding member is fixed to the flange by heat sealing the perimeter portion of the first layer to the flange.

8. The package of claim 1 wherein the first and second layers of the lidding member are made of a PET material.

9. The package of claim 1 wherein the base member is formed from an APET material.

10. A flexible lidding material formed for heat sealing to a rigid base member having a cavity configured to receive an item therein and a peripheral flange surface, the lidding material comprising:
  a first layer, the first layer having a central portion and a perimeter portion, the first layer perimeter portion intended to be heat sealed to the flange of the base member,
  a second layer adhered to the first layer, the second layer overlapping the central portion and the perimeter portion of the first layer
  an adhesive layer for adhering the first layer to the second layer, the adhesive layer having
    a pattern applied permanent adhesive central portion, the central adhesive portion positioned adjacent to the central portion of the first layer and spaced inwardly from the first layer perimeter portion, and
    a perimeter pressure sensitive adhesive portion surrounding the central adhesive portion, the perimeter adhesive portion releasably securing the perimeter portion of the first layer to the overlapping portion of the second layer and configured to permit the second layer to at least partially separate from the perimeter portion of the first layer during peeling of the lidding member;
  a central score line within the first layer, the central score line substantially surrounding the central adhesive portion, wherein the central score line permits the first layer perimeter portion to separate from the lidding member during peeling, and
  a tab portion projecting from the perimeter portion of the first layer, the tab portion having an edge score line formed in the first layer, the edge score line position directly adjacent the perimeter portion of the first layer,
  wherein the tab portion starts the peeling of the lidding member, with the second layer separating from the first layer between the edge score line and the central score line, exposing the perimeter adhesive portion, and
  wherein the exposed perimeter adhesive portion permits the selective resealing of the second layer to the perimeter portion of the first layer.

11. The flexible lidding material of claim 10 wherein the edge score line comprises multiple parallel score lines.

12. The flexible lidding material of claim 10 wherein the edge score line comprises two parallel edge score lines.

13. The flexible lidding material of claim 10 further comprising an ink layer positioned between the adhesive layer and the second layer.

14. The flexible lidding material of claim 10 wherein the first layer is heat seal compatible with the flange of the base member.

15. The flexible lidding material of claim 1 wherein the first and second layers of the lidding member are made of a PET material.

* * * * *